United States Patent [19]

Watanabe

[11] Patent Number: 4,531,606
[45] Date of Patent: Jul. 30, 1985

[54] AIR CLEANER FOR THREE WHEEL VEHICLE

[75] Inventor: Hiromitsu Watanabe, Iwata, Japan

[73] Assignee: Yamaha Hatsudoki Kabushiki Kaisha, Japan

[21] Appl. No.: 455,582

[22] Filed: Jan. 4, 1983

[30] Foreign Application Priority Data

Feb. 6, 1982 [JP] Japan .................................. 57-16973
Feb. 16, 1982 [JP] Japan .................................. 57-23368

[51] Int. Cl.³ ...................... B60K 13/02; B62D 61/08
[52] U.S. Cl. .................................. 180/210; 55/385 B; 180/215
[58] Field of Search ............... 180/215, 217, 210, 225, 180/219; 55/385 B, DIG. 28

[56] References Cited

U.S. PATENT DOCUMENTS

| 3,650,344 | 3/1972 | Plessinger | 180/217 |
| 4,364,340 | 12/1982 | Kimura | 180/219 |
| 4,392,536 | 7/1983 | Iwai et al. | 180/217 |
| 4,402,379 | 9/1983 | Hoshi | 180/225 |

FOREIGN PATENT DOCUMENTS

737327  9/1955  United Kingdom .............. 55/385 B

*Primary Examiner*—John A. Pekar
*Attorney, Agent, or Firm*—Ernest A. Beutler

[57] ABSTRACT

A three wheel off the road vehicle having a configuration that facilitates servicing of the air filter element. The air cleaner housing is positioned at the rear of the vehicle between the rear wheels and with a portion in an open area for direct access. The air filter element is removable for servicing through this opening upon removal of an access plate.

15 Claims, 5 Drawing Figures

AIR CLEANER FOR THREE WHEEL VEHICLE

BACKGROUND OF THE INVENTION

This invention relates to an air cleaner for a three wheel vehicle and more particularly to an improved vehicle construction that facilitates servicing of the air cleaner element.

Many vehicles, particularly those used for recreational purposes, are operated in conditions that necessitate frequent servicing of various components of the vehicle. For example, vehicles such as three wheel engine driven vehicles are often operated in sandy areas such as at beaches or in deserts. Operating in this type of terrain causes the air filter element to become clogged more frequently than if the vehicle is driven over normal roads. However, such recreational vehicles oftentimes do not receive the necessary servicing due to the relatively inexcessible location of the components to be serviced. For example, because of the type of terrain over which they are operated, it is necessary to provide an air filter element for the induction system of the engine of such vehicles. However, due to the relatively compact nature of recreational vehicles and particularly those of the three wheel type, the air cleaner is normally located in an inexcessible area. As a result, the air filter element is not serviced as often as is necessary and poor performance results.

It is, therefore, a principal object of this invention to provide an improved vehicle construction in which the components to be serviced are located in a readily accessible area.

It is another object of this invention to provide a three wheel vehicle construction in which the air cleaner element may be readily serviced.

SUMMARY OF THE INVENTION

A first feature of this invention is adapted to be embodied in an induction system for a vehicle that has a frame, a body supported at least in part over the frame and an engine. The engine has an induction system that includes an air cleaner housing and an air filter element that is contained within the air cleaner housing. In accordance with this feature of the invention, the air cleaner housing has a removable portion for providing access to the air filter element for servicing. The removable portion is located for direct access to the air filter element without removal of any other component of the vehicle.

Another feature of the invention is adapted to be embodied in a vehicle that has a frame, a body supported at least in part over the frame and in which the body and the frame provide an open area that is directly accessible from the exterior of the vehicle. An engine is supported by the frame and has an induction system that includes an air cleaner housing and an air filter element. In accordance with this feature of the invention, the air cleaner housing is positioned for direct access through the open area provided by the body and the frame.

DETAILED DESCRIPTION OF THE PREFERRED EMBODIMENT

Figure 1:
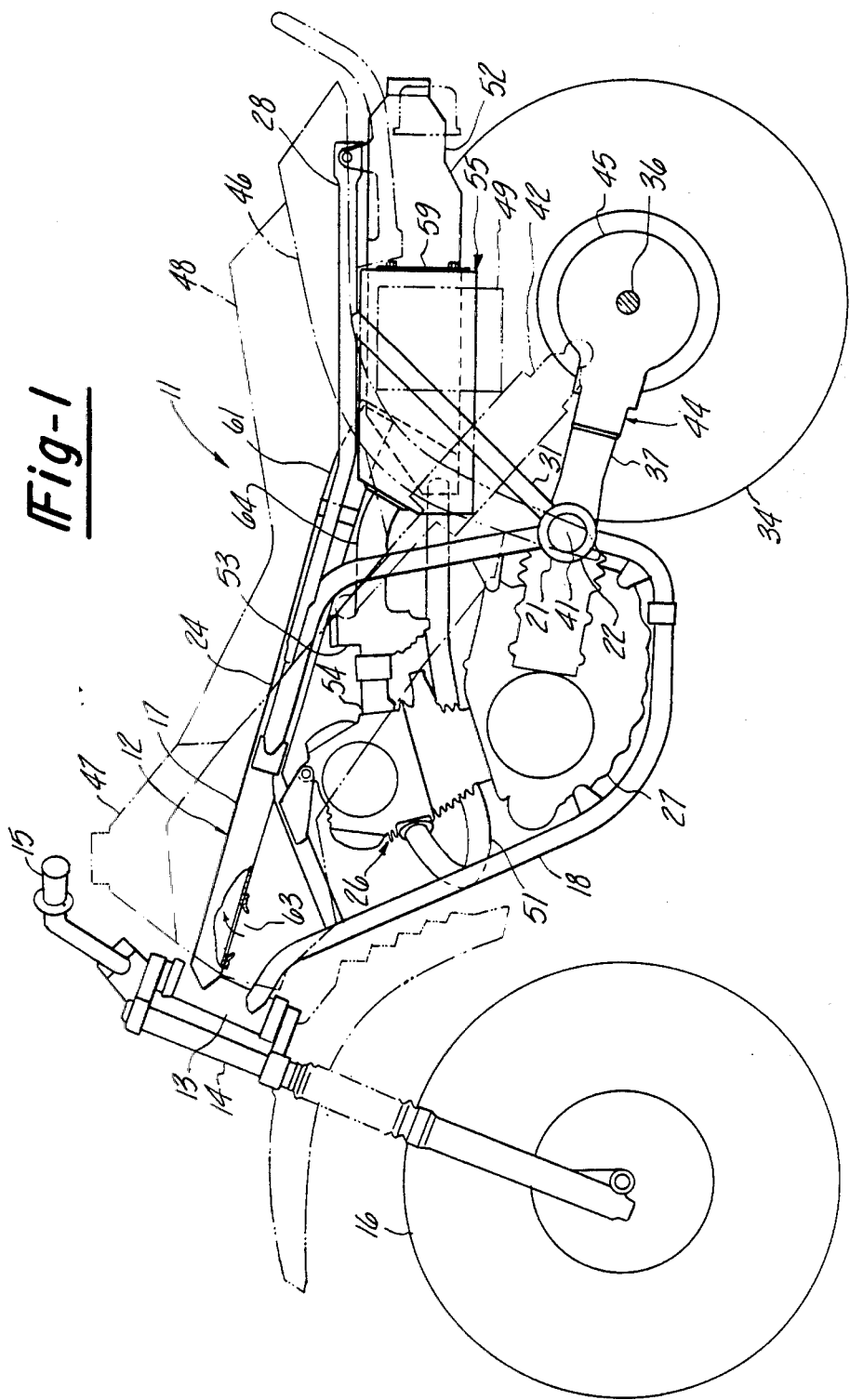
FIG. 1 is a side elevational view of a three wheel vehicle embodying this invention, with certain components shown in phantom.
Figure 2:
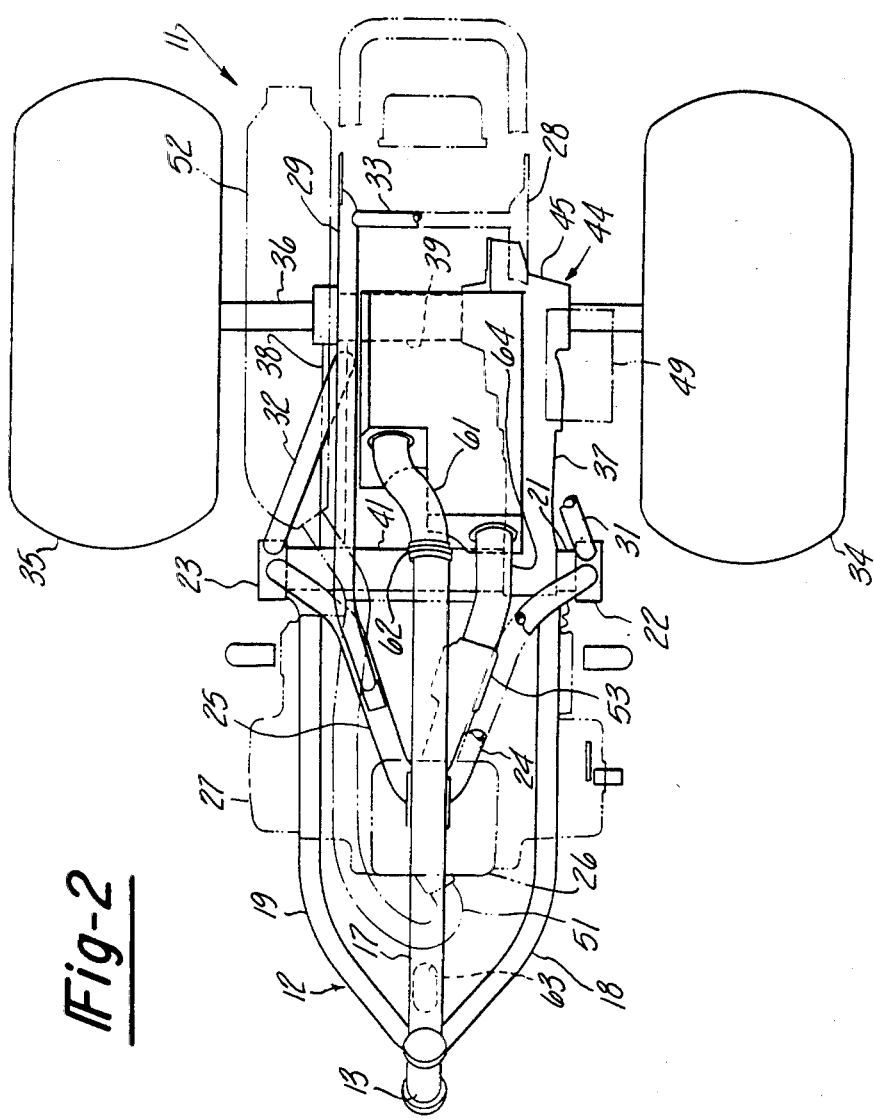
FIG. 2 is a top plan view of the vehicle with certain components shown in phantom and with other components deleted.

In the drawings, the reference numeral 11 indicates generally a three wheeled vehicle constructed in accordance with an embodiment of the invention. In the drawings, certain portions of the vehicle 11 have been deleted in some figures and other components have been shown in phantom. This is done to more clearly show the construction and features of the invention.

The vehicle 11 includes a tubular frame assembly, indicated generally by the reference numeral 12. The frame assembly 12 includes a head pipe 13 that supports a fork assembly 14 for steering movement under control of a handlebar 15 in a known manner. A single front wheel carrying a tire of the balloon type 16 is rotatably supported and supported for suspension movement by the front fork 14 in a known manner.

The frame assembly 12 also includes a main pipe 17 that extends rearwardly from the head pipe 13 in a generally horizontal direction and which is hollow, for a reason to be described. The frame 12 is of the double cradle type and has a pair of down tubes 18 and 19 that are affixed to the head pipe 13 adjacent to the main pipe 17 and which extend downwardly and rearwardly. The down tubes 18 and 19 have reversely bent rear ends that extend upwardly and which are welded to a cross tube 21 and specifically to its end portions 22 and 23, respectively. Back stays 24 and 25 are welded at their forward ends to an intermediate portion of the main tubes 17 and extend downwardly and outwardly and are also affixed at their rear ends by welding to the cross tube end portions 22 and 23 so as to complete the main portion of the frame assembly 12.

An internal combustion engine, indicated generally by the reference umeral 26, is supported within the double cradle of the frame 12 in a known manner. The engine 26 has a combined crankcase and transmission assembly 27 of a generally known type.

A pair of seat rails 28 and 29 are affixed to the back stays 24 and 25, respectively, and extend rearwardly from the main portion of the frame assembly 12. A pair of seat pillar rails 31 and 32 are affixed at their upper rearward ends to the seat rails 28 and 29, respectively, and are affixed at their forward ends to the end portions 22, 23, respectively, of the pipe 21. The rear ends of the seat rails 28 and 29 may be interconnected by means of a cross pipe 33 to add further rigidity to the frame assembly 12.

A pair of balloon type rear tires 34 and 35 are carried by wheels which are in turn affixed to a rear axle 36. The rear axle 36 is, in turn, rotatably journalled by means of a trailing arm assembly that consists of a pair of spaced trailing arm portions 37 and 38 that are joined at their rearward end by means of a cross tube 39 which, in turn, rotatably journals the axle 36 in a known manner. The forward ends of the trailing arm portions 37 and 38 are also interconnected by means of a cross pipe 41 which is, in turn, pivotally supported by the frame cross pipe 21 in a known manner. The suspension movement of the rear wheels 34 and 35 relative to the frame assembly 12 is controlled by a suspension element, indicated generally by the reference numeral 42 which may be of any known type such as a combination coil spring and shock absorber assembly. The suspension element 42 has a rear pivotal connection 43 to the cross pipe 39 and a front pivotal connection to the frame assembly in any known manner so as to control the movement of the rear wheels 34 and 35 relative to the frame assembly 12.

The transmission portion of the combined crankcase and transmission assembly 27 has an output shaft that drives a drive shaft (not shown) than extends through the trailing arm portion 37. A universal joint (not shown) may be located at the pivot axis of the tube 41 may be included to transfer the final drive from the transmission 27 to the drive shaft. The drive shaft, in turn, drives a final drive assembly, indicated generally by the reference numeral 44 that includes an outer housing 45 formed at the rear end of the trailing arm portion 37. The final drive 44 may be of any known type and typically includes a pinion gear driven by the drive shaft and a ring gear that is affixed in a suitable manner to the axle 36.

A body assembly, which may be formed of molded fiberglass or the like and of any suitable configuration, indicated generally by the reference numeral 46 is supported upon the frame assembly 12 in a known manner. The body assembly 46 extends rearwardly from a portion 47 that surrounds the fuel tank (not shown) adjacent the head pipe 13 and which extends rearwardly to form fender portions that extend over the rear tires 34 and 35. In addition, the body 46 has downwardly depending sides that conceal the uppermost portion of the engine 26 and some of the components associated with it. A seal 48 is also supported upon the body portion 46 so as to accommodate one or more riders.

A battery box 49 is supported at the rear side of the frame and body assembly by means of brackets that are affixed, for example, to the seat pillar rail 31 and the seat rail 28. A battery is contained within the battery box 49 for powering the vehicle in a known manner.

In the illustrated embodiment, the engine 26 is positioned with its exhaust port or exhaust ports facing forwardly. An exhaust pipe 51 extends from the exhaust port of the engine forwardly and then reverses to extend rearwardly along one side of the vehicle 11 on the side of the engine 26. The exhaust pipe 51 terminates at a longitudinally extending muffler 52 that is positioned at one side of the vehicle 11 in proximity to the rear wheel 35 and which has a rear discharge.

The vehicle 11 is primarily intended for recreational, off the road use. Because of its extremely compact nature, it should be readily apparent that the location of the components creates several design problems. Furthermore, because of its extremely compact nature, many of the components which require frequent servicing may be located in a concealed location so that necessary servicing will be omitted due to the inconvenience. One of the components which requires frequent servicing is the air cleaner and specifically the air cleaner element. This is particularly true in view of the fact that the vehicle 11 is operated in off the road environments wherein the provision of protection for the induction system and internal components of the engine is particularly important. In conventional vehicles of this type, the air cleaner element is located in an area where servicing is extremely difficult. As a result, owners have a tendency to ignore servicing of the air cleaner element and poor engine performance can result. In accordance with this invention, the air cleaner element is positioned in an area where servicing is facilitated, as will now be described.

Figure 3:
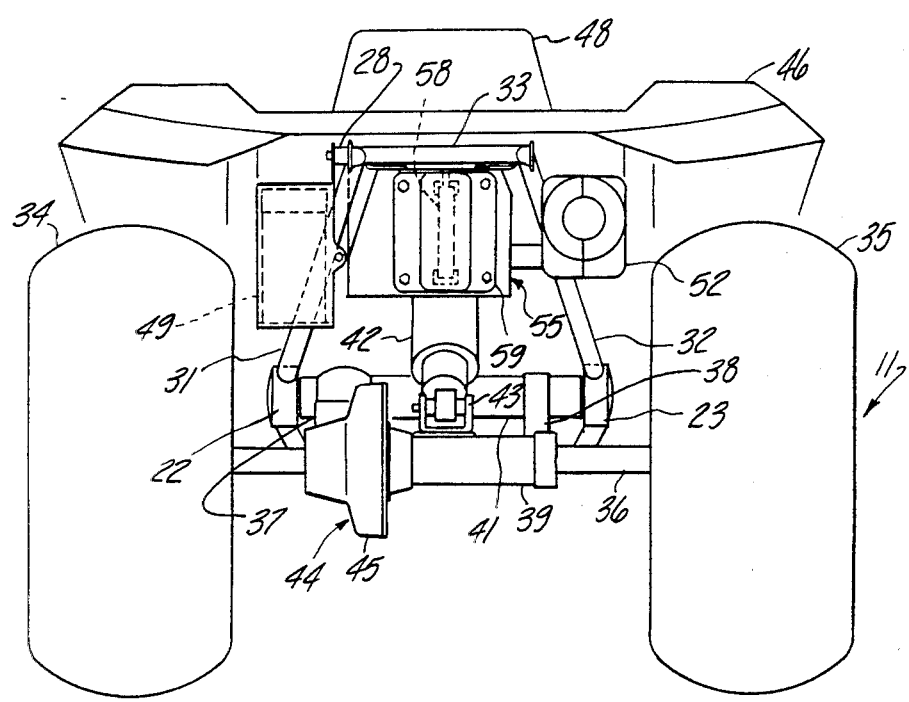
FIG. 3 is a rear elevational view of the vehicle.
Figure 4:
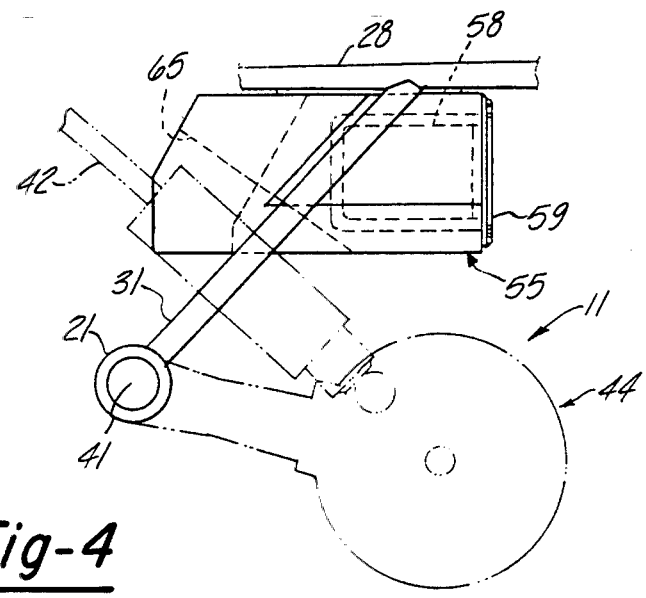
FIG. 4 is a partial view showing the rear portion of the vehicle.
Figure 5:
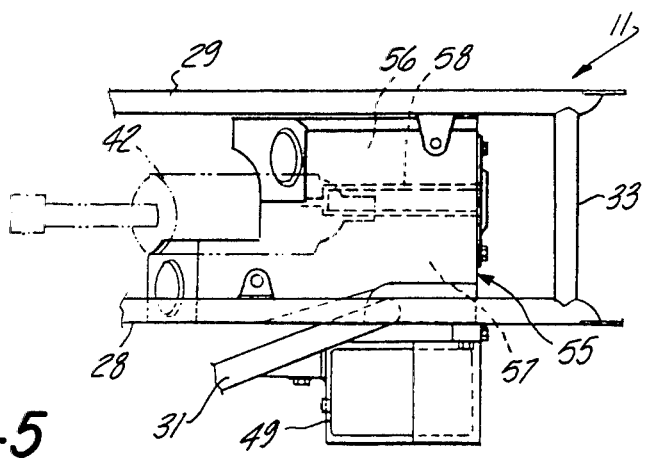
FIG. 5 is a top plan view of the rear portion of the vehicle with certain components removed.

In the illustrated embodiment, the engine 26 is provided with one or more rearwardly facing intake ports. One or more charge forming devices in the form of carburetors 53 are positioned to the rear of the engine and supply a fuel/air charge to its intake ports via a relatively short intake pipe 54. The filtered air charge is delivered to the inlet to the carburetor 53 from an air filter assembly, indicated generally by the reference numeral 55. The air filter assembly 55 includes an outer housing that is mounted to the seat rails 28 and 29 in a known manner and which is positioned between the rear wheels 34 and 35 and which extend generally longitudinally of the vehicle. As will be noted from FIG. 3, the rear surface of the air cleaner housing 55 is disposed in an area where the frame 11 and body 46 provide a clear access opening.

The air cleaner housing 55 is divided into an inlet side 56 and an outlet side 57 by means of a longitudinally extending, serviceable air filter element 58. The element 58 is sealingly engaged with the housing 55 in a known manner and divides the interior of the housing into the two aforenoted sides. The rear face of the housing 55 is provided with a generally rectangular access opening in proximity to the air filter element 58. This access opening is closed by means of a removable closure plate 59. The plate 59 may be easily removed for servicing of the air filter element 58 which can then be drawn rearwardly from the housing 55 for either cleaning and/or replacement.

An air inlet pipe 61 extends forwardly from the inlet side 56 of the interior of the air cleaner housing 55. The forward end of the pipe 61 is in communication with the interior of the main frame tube 17 by means of a slip fit joint and clamp 62. The main tube 17 thus forms an inlet for the air induction system of the engine and for this purpose, its lowermost forward end is provided with an inlet opening 63. The inlet opening 63 is positioned beneath the body 46 and in an area that is generally protected from the surrounding environment. Thus, it will be insured that a relatively clean source of air is delivered to the air cleaner housing inlet portion 56.

The outside air that enters the air filter housing inlet portion 56 will flow transversely through the air filter element 58 so that the element 58 will remove foreign particles from the inlet air. The air then flows into the discharge portion 57 of the air filter housing 55. The thus filtered air is delivered to the inlet to the carburetor 53 through an intake pipe 64. Thus, a continuous supply of clean filtered air will be provided for the induction system of the engine through the system aforedescribed.

The suspension element 42 extends in a generally horizontal direction and is inclined somewhat to the vertical. The use of a single suspension unit 42 at approximately the center line of the vehicle 11 places the suspension element 42 in proximity to the air filter housing 55. This is partially a result of the desire to maintain a compact arrangement for the overall configuration of the vehicle. In order to provide adequate clearance for movement of the suspension element 42 during suspension travel, the forwardmost lower wall of the air cleaner housing 55 is provided with an inclined portion 65. The inclined wall 65 will afford adequate clearance during full suspension travel.

It should be readily apparent that the aforedescribed construction permits a very compact recreational vehicle that is susceptible for off the road use and which nevertheless permits servicing of the important components, particularly the air cleaner element, without removal of any other component of the vehicle. Although a preferred embodiment of the invention has been described and illustrated, it is believed to be obvious to thos skilled in the art that various changes and modifications may be made without departing from the spirit and scope of the invention as defined by the appended claims.

I claim:

1. In an induction system for a vehicle having frame means, at least one front wheel dirigibly supported by said frame means, a pair of transversely spaced apart rear wheels supported by said frame means, a body supported at least in part over said frame means, an engine, means for driving said rear wheels from said engine, and an induction system for said engine comprising an air cleaner housing and an air filter element contained within said air cleaner housing, the improvement comprising said air cleaner housing being disposed rearwardly of said engine and between said rear wheels and having a removable portion for providing access to said air filter element for servicing, said removable portion being located for direct access to said air filter element without removal or movement of any other component of said vehicle.

2. In an induction system as set forth in claim 1 wherein the air cleaner housing extends longitudinally of the vehicle and the air filter element extends longitudinally of the vehicle and divides the air filter housing into transversely spaced inlet and discharge sides.

3. In an induction system as set forth in claim 2 wherein the rear face of the air cleaner housing defines a rearwardly opening access portion in alignment with the air filter element and further including a removable panel normally closing said opening.

4. In an induction system as set forth in claim 3 wherein the engine is positioned forwardly of the air cleaner housing and a pipe interconnects the outlet side of the air cleaner housing with the induction system of the engine.

5. In an induction system as set forth in claim 3 wherein the frame includes a generally horizontally and longitudinally extending main tube that is hollow and which terminates in proximity to the air cleaner housing, and further comprising a conduit interconnecting an open end of said tube with the air cleaner housing inlet side, the forwardmost end of said tube having an inlet opening formed therein.

6. In an induction system as set forth in claim 5 wherein the body at least in part surrounds and protects the inlet to said tube.

7. In a vehicle having frame means, at least one front wheel dirigibly supported by said frame means, a pair of transversely spaced apart rear wheels supported by said frame means, a body supported at least in part over said frame means, said body and said frame means providing an open area directly accessible from the exterior of said vehicle, an engine supported by said frame means, means for driving said rear wheels from said engine, and an induction system for said engine including an air cleaner housing and an air filter element contained within said air cleaner housing, the improvement comprising said air cleaner housing being disposed rearwardly of said engine and between said rear wheels and being positioned for access of the air filter element through the open area provided by the body and the frame means.

8. In an induction system for a vehicle having frame means, a body supported at least in part over said frame means, an engine, a pair of rear wheels driven by the engine, and an induction system for said engine comprising an air cleaner housing and an air filter element contained within said air cleaner housing and disposed between said rear wheels, the improvement comprising said air cleaner housing having a removable portion for providing access to said air filter element for servicing, said removable portion being located for direct access to said air filter element without removal or movement of any other component of said vehicle, said frame including a generally horizontally and longitudinally extending main tube that is hollow and which terminates in proximity to said air cleaner housing, a conduit interconnecting an open end of said tube with said air cleaner housing inlet side, the forwardmost end of said main tube having an air inlet opening formed therein.

9. In an induction system as set forth in claim 8 wherein the engine is positioned forwardly of the air cleaner housing and a pipe interconnects the outlet side of the air cleaner housing with the induction system of the engine.

10. In an induction system as set forth in claim 9 wherein the inlet side and outlet side openings of the air cleaner housing are in a forwardmost face thereof.

11. In an induction system for an off the road vehicle having a pair of driven rear wheels and at least one dirigible front wheel, an engine positioned contiguous to said rear wheels and having a rearwardly facing induction system inlet, a seat extending forwardly from said rear wheels, and an air cleaner positioned in proximity to and to the rear of said engine and said induction system inlet and contiguous to said rear wheels, the improvement comprising an inlet device comprising an elongated tube means terminating at an outlet end rearwardly of the engine and communicating with a forwardly facing inlet of said air cleaner for supplying air to said air cleaner from an inlet end forwardly of the engine and disposed in a protected area contiguous to the front of said vehicle, said inlet end being disposed so that foreign materials will be precluded from entry thereto, a forwardly facing outlet from said air cleaner, and conduit means connecting said forwardly facing air cleaner outlet with said rearwardly facing induction system inlet.

12. In an induction system as set forth in claim 11 wherein the vehicle includes a frame means made up of a plurality of interconnected tubular members, said inlet device elongated tube means including at least in part one of said frame tubes.

13. In an induction system as set forth in claim 12 wherein the one frame tube comprises a generally horizontally extending tube positioned substantially on the longitudinal center line of the vehicle.

14. In an induction system as set forth in claim 11 wherein the vehicle has a body covering at least in part the inlet end of the inlet device for precluding the entry of foreign materials thereto.

15. In an induction system as set forth in claim 11 wherein the air cleaner comprises an outer housing defining a cavity therein, an air filter element contained within said cavity and dividing said cavity into two parts, said air cleaner forwardly facing inlet being in communication with one of said parts and said air cleaner forwardly facing outlet being in communication with the other of said parts for the flow of air through said air cleaner element from said air cleaner inlet to said air cleaner outlet.

* * * * *